United States Patent [19]
Johnson

[11] 3,808,352
[45] Apr. 30, 1974

[54] ELASTOMERIC TERMINAL INSULATOR AND STRESS CONE AND CONDUCTOR TERMINATED THEREWITH

[75] Inventor: Leonard A. Johnson, Woodbury, Minn.

[73] Assignee: Minnesota Mining and Manufacturing Company, St. Paul, Minn.

[22] Filed: Oct. 26, 1972

[21] Appl. No.: 301,066

[52] U.S. Cl.................. 174/73 R, 174/80, 174/135
[51] Int. Cl............................................ H02g 15/02
[58] Field of Search............ 174/73 R, 73 SC, 74 A, 174/75 R, 75 D, 77 S, 80, 135

[56] References Cited
UNITED STATES PATENTS

| | | | |
|---|---|---|---|
| 2,835,724 | 5/1958 | Colbert | 174/77 S UX |
| 3,243,756 | 3/1966 | Ruete et al. | 174/73 R X |
| 3,352,962 | 11/1967 | Brown et al. | 174/73 R |
| 3,377,420 | 4/1968 | Brown et al. | 174/73 R |
| 3,515,798 | 6/1970 | Sievert | 174/135 |

FOREIGN PATENTS OR APPLICATIONS

| | | | |
|---|---|---|---|
| 1,408,279 | 7/1965 | France | 174/73 R |
| 1,056,223 | 4/1959 | Germany | 174/73 R |
| 1,918,451 | 11/1969 | Germany | 174/73 R |

OTHER PUBLICATIONS

Brochure IMF-126 entitled "Termi–Matic Cable Termination Systems," published by General Electric Co., Oct. 1969, 8 pages.

Primary Examiner—Laramie E. Askin
Attorney, Agent, or Firm—Alexander, Sell, Steldt & DeLaHunt

[57] ABSTRACT

A terminal for high voltage electrical cable comprising an elastomeric stress cone which is friction-fitted over the insulating sleeve of a power cable after the sleeve has been coated with a silicone grease, and an elastomeric terminal insulator which is supported in a stretched condition initially to have a central opening to receive the cable and which insulator is allowed to return toward its normal state to tightly fit about the insulating sleeve. The elastomeric terminal insulator is stretched about a core which core has an inside diameter larger than the outer diameter of the insulating sleeve. The core is removed progressively from one end toward the other, permitting the insulator to contract and tightly grip one end of the stress cone and a length of the insulating sleeve.

6 Claims, 4 Drawing Figures

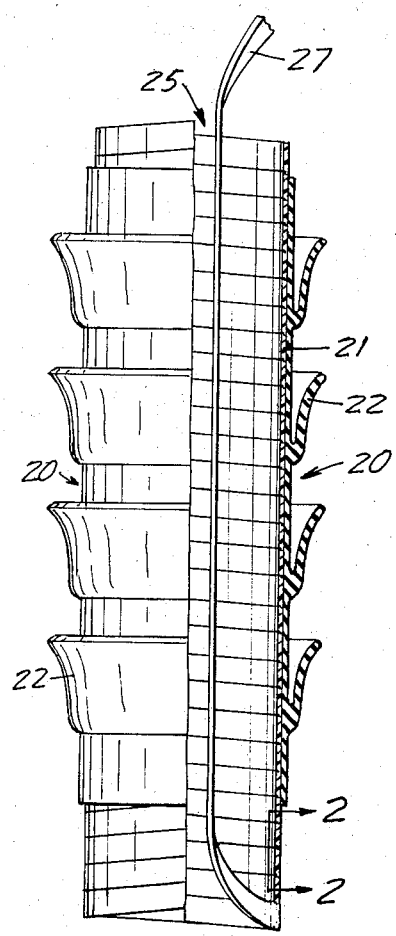
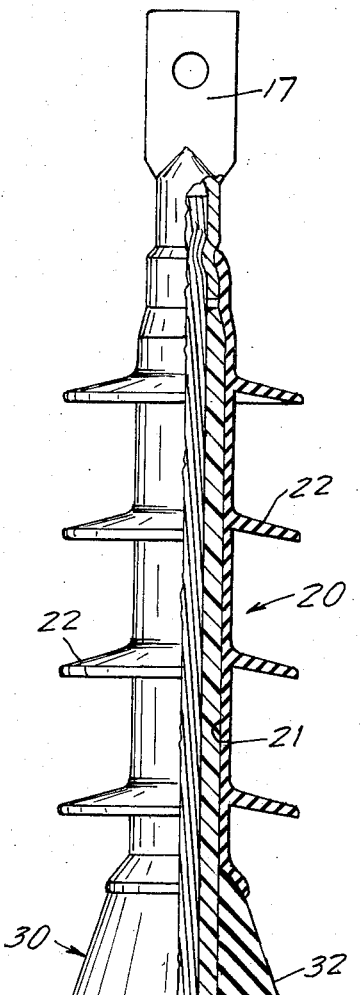
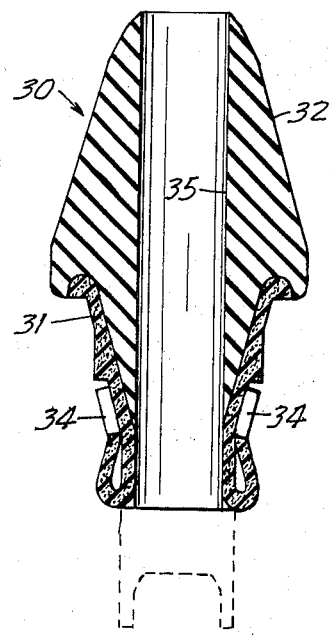
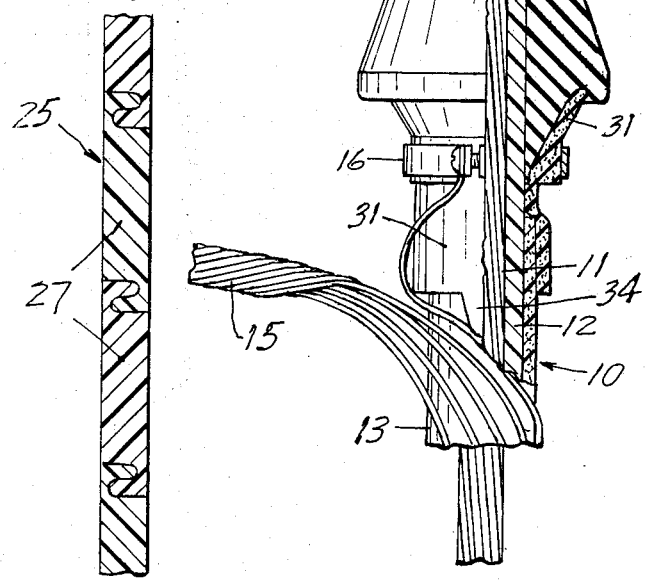
FIG. 1  FIG. 4  FIG. 3
FIG. 2
PATENTED APR 30 1974          3,808,352

ELASTOMERIC TERMINAL INSULATOR AND STRESS CONE AND CONDUCTOR TERMINATED THEREWITH

BACKGROUND OF THE INVENTION

This invention relates to an improvement in insulators to be applied at terminal ends of high voltage electrical cables to provide high insulating qualities and to protect the cable from destruction by the high electrical stress existing at the termination.

Terminals for high voltage electrical cables have been utilized for many years. The prior art teaches the use of ceramic terminals having axially spaced radially projecting circular rings to extend the length of the path from one end of the connector to the other to restrict arcing therebetween. Connecting a cable to the ceramic insulators has been an area of considerable inventive endeavor. The problems associated with providing a good termination result from a failure of a good insulating band being formed between the conductor and the ground to lessen the possibility of ionization of air therebetween which causes a chemical and mechanical breakdown in the insulation therebetween.

Recently, polymeric materials have been developed which are elastomeric and fit more closely to the cable and which can withstand the weathering and provide electrical and mechanical protection for terminals. One such terminal insulator has been made to be heat shrinkable. This insulator is described in an article entitled "A Heat Shrinkable Termination System for High Voltage Cables" which was presented at the Tenth Electrical Insulation Conference in Chicago, Illinois between September 20th and 23rd in 1971, by R. J. Pennick and R. J. T. Clabburn, and published in the proceedings of that conference at pages 292 and 297. This article discloses the comparison of many different types of polymers including polyethylene, ethylene-propylene copolymers, ethylene-propylene terpolymers, silicone elastomers and the like coupled with the effects of certain additives. Subjecting the material to sufficient heat however to produce the shrinking of the silicone rubber insulator onto the insulating sleeve can result in some degradation of the insulating sleeve.

Other terminal insulators have been formed with molded elastomer compositions and connection to these conductors was similar to that of connecting the end of a power cable to the ceramic insulators.

It is necessary in the termination of a high power electrical cable to avoid air pockets appearing between the conductor and the outer surface of the insulator because of the high electrical stress of the cable. The presence of pockets between the cable and the outer surface of the cable or termination results in a chemical and mechanical breakdown in the adjacent insulation which breakdown will progress until the insulative property of the cable insulation is completely destroyed and the high voltage carried by the conductor will arc to the available shield and ground lines.

It is therefore an object of persons supplying products for the purpose of termination of high power electrical cables to provide a terminal insulator which is easily applied to the power cable in the field, has sufficient mechanical strength and physical properties to withstand weathering and the sudden changes in temperature which exist in a terminal, and which will maintain a high insulating quality without cracking or oxidizing when affected by the environment, sun, rain, pollution and the like. It is also necessary that in the installation of the insulator that no air pockets are formed and the high electrical stresses are not damaging. Also, to suitably fill the need, the terminal should be economical to the customer.

BRIEF DESCRIPTION OF THE INVENTION

The terminal of the present invention comprises an elastomeric stress cone and an elastomeric insulator. The stress cone is so designed that it may be applied over the insulating sleeve of a high voltage electrical power cable in the field and the elastomeric insulator may be applied over the insulating sleeve to cover the insulating sleeve and a portion of the stress cone. The insulator is an elastomeric member which has been pre-stressed to provide a large inside diameter for receiving the terminal end of the power cable and may then be allowed to contract onto the insulating sleeve as the same relaxes toward its normal size. The terminal of the present invention is adapted for use with an electrical cable having a central conductor, an insulating sleeve and an outer semiconductive shield. The shield is removed from a length of the insulating sleeve, which length is extended through an elastomeric stress cone which has a smaller inner cylindrical bore than the outside diameter of the insulating sleeve to tightly fit onto the insulating sleeve. The stress cone is moved on the insulating sleeve against the end of the cut semiconductive shield surrounding the insulating sleeve. The stress cone has a cylindrical end folded upon itself which may be unfolded to overlap the end of the semiconductive shield. The extended end of the central conductor and the insulating sleeve, upon which conductor a terminal connector may be clamped, is then placed through the center of the insulator. The insulator is an elastomeric member which has been stretched to increase the internal diameter of the bore centrally therethrough by at least two times and is supported on a removable core having a large enough internal diameter to receive the terminal connector, central conductor, and the insulating sleeve. After the insulator has been placed over the insulating sleeve, the core is removed from the insulator and it will elastically relax or return toward its normal unstressed condition, fitting tightly about the insulating sleeve, over a portion of the stress cone near the outlet end of the bore therethrough, and over a portion of the termination connector.

DESCRIPTION OF THE DRAWING

The present invention will be further described with reference to the accompanying drawing wherein:

FIG. 1 is an elevational view partly in section of an insulator constructed according to the present invention;

FIG. 2 is a detailed sectional view taken along the lines 2—2 of FIG. 1 to show the cross section of the core;

FIG. 3 is an elevational view partly in section of a stress cone according to the present invention; and FIG. 4 is an elevational view of a terminal partly in section constructed according to the present invention.

Like reference numerals will refer to like parts throughout the several views. There is shown in the drawing the elements for forming an insulated termination of a high voltage electric power cable generally designated 10. The electric cable 10 is of the type having a central conductor 11 comprising a central wire and six helically wound wires, an insulating sleeve 12 positioned between the conductor 11 and a semiconductive shield 13. In the cable illustrated the semiconductive shield 13 is also wrapped with helically wound ground wires 15 one of which is joined to a grounding clamp 16, see FIG. 4. In making a termination of a high voltage electric power cable 10, it is convenient to apply a terminal connector 17 to the end of the conductor 11.

An elastomeric termination insulator 20 is adapted to be applied to the end of the cable 10 to provide a sufficient insulator between the end of the cable and the ground wire or grounding shield on the cable. This insulator must provide a sufficiently long surface path between the termination connector 17 and the ground wires 15 such that arcing therebetween is restricted. The insulator 20 illustrated in FIG. 1 is formed of a silicone rubber composition available from Dow Corning Co., Midland, Michigan, as No. S 55U, and is molded to define a member having an internal cylindrical bore 21 and an outer cylindrical surface about which are positioned in axially spaced relation a number of skirts or rings 22 aiding in providing the long path along the outer surface between the ends of the insulator. This insulator 20 is initially molded to have an inside diameter of .5 inch (1.27 cm) and a wall thickness of .1 inch (.25 cm), thus having a stress condition when placed about high voltage electrical power cables having insulating sleeves with an outside diameter from .65 to .9 inch (1.65 – 2.23 cm). The skirts 22 are formed such that they taper from the outer cylindrical surface outwardly toward the outer narrower cylindrical peripheral surface having a diameter of 2.25 inches (5.7 cm) and the upper edge of the peripheral surface of the skirt 22 is radiused and the other edge is formed with a sharper, more definite edge to afford runoff of moisture striking the insulator. The insulator 20 is stressed elastically to fit about a unitary tubular hollow core 25 comprising a continuous narrow helically wound strip 27 of tough flexible material. The continuous strip 27 is grooved along its edges as shown in FIG. 2 and can be removed through the bore of the core, i.e., between the core 25 and the insulating sleeve 12. The elastomeric insulator 20 in radially extended or stretched condition fits over a core having a 1.5 inches outside diameter (3.8 cm) and a 1.4 inches inside diameter (3.5 cm). This insulator, stretched to three times its normal size, will elastically return toward its normal position to closely conform and tightly retain the insulator 20 over the insulating sleeve 12 progressively upon removal of the strip 27. contraction of the insulator 20 results in the application of a resultant force against the insulating sleeve and any other member placed within the bore of the core. The thin walled insulator performs as efficiently as insulators using nearly 10 times as much material, e.g., EPDM and thus its excessive cost still makes the silicone elastomer economical.

A boot or stress cone 30 is first applied to the terminal end of the high voltage electrical power cable. This boot 30 is a member which is molded in two stages. A molded sleeve 31 which forms the inlet end of the boot 30 is molded first and is formed of a conductive rubber. After molding of the generally funnel-shaped sleeve 31 it is placed in another mold where a heavier walled generally conical section 32, to insulate the electrical stress, is molded and vulcanized to the interior of sleeve 31. The sleeve 31 is formed of a flexible resilient elastomeric semiconductive material having surface resistance less than 50,000 ohms per square centimeter, such material being sold by duPont de Nemours Co. of Wilmington, Delaware, under the trademark "Nordel," which is a conductive ethylene propylene diene monomer (EPDM) elastomer. The section 32 of the boot 30 is formed of "Nordel" insulating rubber, ethylenepropylene terpolymer which has a resistance greater than 2 megohms per ohm-centimeter. The sleeve 31 of the boot 30 is folded as shown in FIG. 3 and has two diametrically spaced tabs 34 formed thereon to permit the same to be unfolded from its position defining an inlet end to a position overlapping the terminal end of the semiconductive shield 13. The boot 30 has a smooth cylindrical bore 35 therethrough having a diameter of about .6 inch (1.52 cm).

In a typical installation as shown in FIG. 4 the lineman has determined the length of the power cable necessary to reach the termination point, has cut the cable, peeled the insulating sleeve to expose the conductor 11 and has applied the terminal connector 17 to the conductor 11. The semiconductive shield 13 is then removed to expose a predetermined length of the insulating sleeve 12. The ground wires are also peeled from the outer surface of the power cable but are not severed. A grounding clamp 16 may be placed over the power cable 10 and then the surface of the insulating sleeve 12 is coated with an insulating silicone grease. The end of the power cable is then forced through the boot 30 entering at the folded inlet end of the sleeve 31 and being forced through the bore 35 to cause expansion of the boot to fit tightly over the insulating sleeve 12. The boot 30 is moved down the insulating sleeve 12 until it abuts the semiconductive shield 13. In this position some of the grease is wiped from the insulating sleeve and fills any voids therebetween. The sleeve 31 may be unfolded by grasping the tabs 34. The sleeve 31 of the boot will thus cover the semiconductive shield 13 at its end, and because of its elastic stress and the presence of the grease at the end of the shield, no air pockets will exist underneath the boot. The extended end of the insulating sleeve 12 is then placed within the bore of the core 24 for the insulator 20. The end of the insulator which is to cover the outlet end of the boot is positioned over the tapered end of the boot 30, the strip 27 is drawn through the bore in a direction toward the terminal connector 17 causing the insulator 20 to elastically grip the outlet end of the boot and the insulating sleeve 12 as the core is progressively withdrawn. Hand pulling of the strip 27 from the core progressively causes this grooved and interlocking strip to unwind and the insulator 20 relaxes over the core, but yet, because of the greater diameter of the insulating sleeve 12 then the molded internal diameter of the bore 21 in the insulator 20, the same will grip the insulating sleeve 12 leaving it tightly affixed to the sleeve. After the core 25 is removed the skirts 22 must then be folded downwardly toward the boot 30 such that as the cable weathers and moisture may collect it will run off the skirts around the radiused edge and drop from the lower defined edge of the insulator rather than forming a continuing stream along the body of the insulator. The clamp 16 is secured to a shoulder on the boot to ground the conductive portion 31 of the boot.

Having thus disclosed the present invention with reference to a preferred embodiment, it will be appreciated that changes can be made without departing from the spirit or scope of the invention as defined in the appended claims.

What is claimed is:

1. A termination of a high voltage electrical power cable of the type having a central conductor, and an insulating sleeve between the conductor and a semiconductive shield comprising:

an elastomeric boot having wall means defining a cylindrical bore having an inlet end and an outlet end, said boot having an insulating generally cone-shaped structure with an extended cylindrical thin walled sleeve portion adjacent the inlet end of said bore which portion has been unfolded from a position folded upon itself, said boot being positioned over said conductor and insulating sleeve of said cable with said extended cylindrical thin-walled sleeve portion extending over the end of said semiconductive shield and being in sealing engagement with the end of said shield, and a thin walled elastomeric insulator formed with axially spaced skirts and a cylindrical bore having a diameter the dimension of which is less than the diameter of said insulating sleeve applied over said insulating sleeve and tightly elastically gripping said sleeve, said elastomeric insulator also extending over and tightly elastically gripping the end of the boot opposite to the extended cylindrical sleeve portion and one end of said boot to insulate the exposed insulating sleeve and produce an extended path between the semiconductive shield and the end of the conductor.

2. A termination according to claim 1 wherein said sleeve portion of said boot is formed of a semiconductive material.

3. A termination according to claim 1 wherein the insulator is formed of a silicone rubber composition.

4. A thin walled elastomeric insulator comprising a thin walled cylinder formed with a cylindrical bore having a predetermined inside diameter the dimension of which is less than the outside diameter of an insulating sleeve over which said insulator is adapted to be placed and a plurality of axially spaced skirts formed on said cylinder which skirts taper outward from the outer periphery of said cylinder to a narrower cylindrical peripheral surface, said peripheral surface of each of the skirts being radiused on one edge and the other edge being formed with a sharper more definite edge to break surface tension of liquid moving over the surface of the skirt over said radiused edge and along the peripheral surface to said other edge, said cylinder and said skirts adjacent said outer periphery of said cylinder being stretched several times their normal size, and a hollow core member comprising a continuous narrow strip of tough flexible material in the form of a substantially rigid closed helix having adjacent coils interconnected, said core member being disposed within said cylindrical bore of said stretched cylinder.

5. A thin walled elastomeric insulator according to claim 4 wherein said cylinder has a wall thickness of .1 inch.

6. A thin walled elastomeric insulator according to claim 5 wherein said core member has an outside diameter of 1.5 inches.

* * * * *